Oct. 1, 1963  J. S. SJOSTROM  3,105,935
RELAY TESTING CIRCUIT HAVING MONITOR RELAYS RESPONSIVE
TO IMPROPER OPERATION OF LOAD-CONTROLLING CONTACTS
Filed May 15, 1961  4 Sheets-Sheet 1

INVENTOR.
JOHN S. SJOSTROM
BY
Isidore Match
ATTORNEY

INVENTOR.
JOHN S. SJOSTROM
BY Isidore Match
ATTORNEY

Oct. 1, 1963 J. S. SJOSTROM 3,105,935
RELAY TESTING CIRCUIT HAVING MONITOR RELAYS RESPONSIVE
TO IMPROPER OPERATION OF LOAD-CONTROLLING CONTACTS
Filed May 15, 1961 4 Sheets-Sheet 3
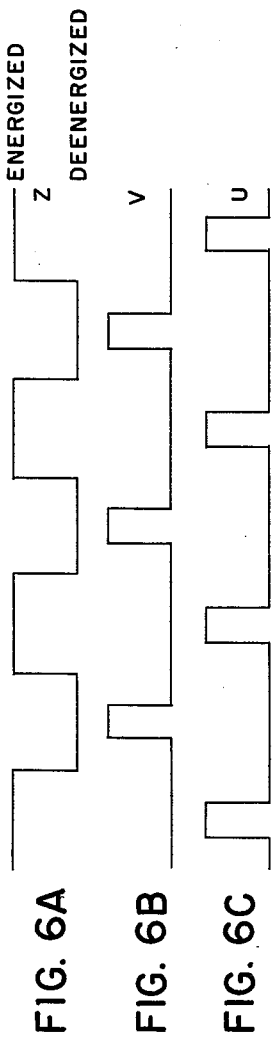
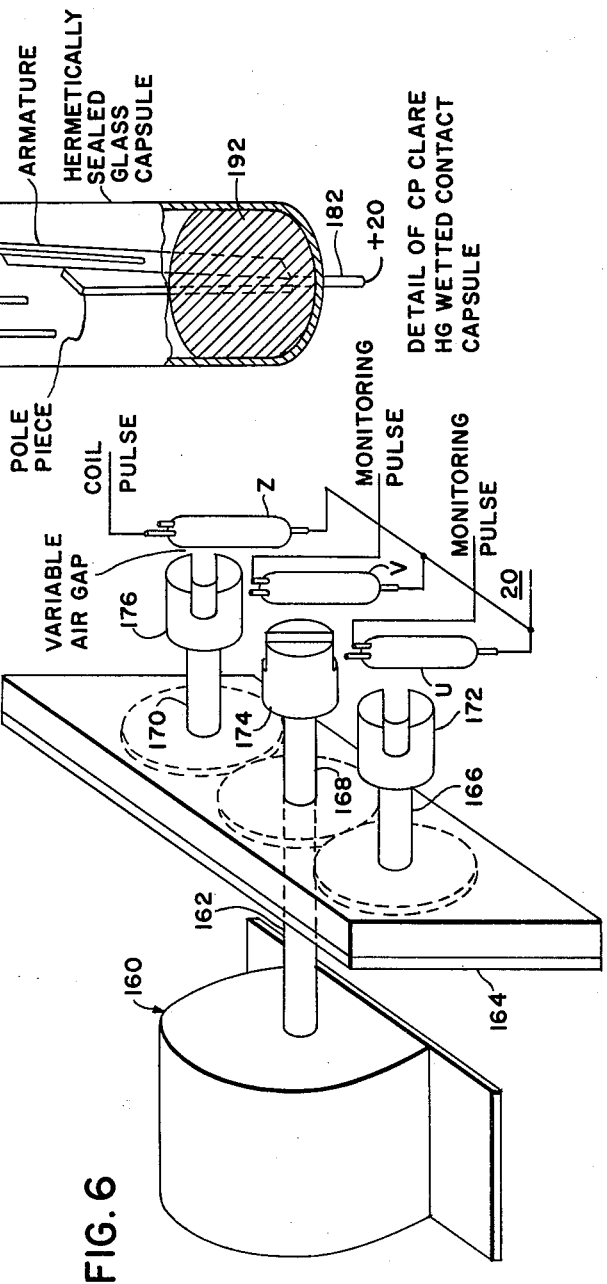
*INVENTOR.*
JOHN S. SJOSTROM
BY Isidore Match
ATTORNEY INVENTOR.
JOHN S. SJOSTROM
BY Isidore Match
ATTORNEY United States Patent Office 3,105,935
Patented Oct. 1, 1963

3,105,935
RELAY TESTING CIRCUIT HAVING MONITOR RELAYS RESPONSIVE TO IMPROPER OPERATION OF LOAD-CONTROLLING CONTACTS
John S. Sjostrom, Fort Defiance, Va., assignor to General Electric Company, a corporation of New York
Filed May 15, 1961, Ser. No. 110,082
9 Claims. (Cl. 324—28)

This invention relates to test systems. More particularly, it relates to a system for test monitoring relays and contacts associated therewith.

With the presently existing rapid advance in the electrical and electronic arts and with the consequent development of highly complex systems, the need for reliability of circuit components in these systems has become increasingly necessary. Typical examples where such reliability is especially required are in the fields of industrial automation, navigational systems for water borne and air borne vehicles, and in the extremely complex systems utilized in missiles and in space vehicles.

In connection with missiles and space vehicles, the utmost reliability of components is particularly required since the weight ratio between the pay load and the propulsion weight may easily attain a value of 1000 to 1. Consequently, there is no space or weight availabile for the duplication of circuits to insure reliability. Also, once a space vehicle leaves a launching pad, the electronic system therein can no longer be affected, i.e., repaired and maintained.

With regard to the testing of relays and relay contacts, many systems have been utilized heretofore. For example, a commonly used system has been one wherein indicating lights are connected in parallel with contacts or with loads. Such system has presented the disadvantage in that the load characteristics are consequently altered and/or arc suppression is produced. Another relay test system used quite frequently is one wherein monitor relay coils are connected in parallel arrangement with loads or with contacts. Again, in this latter situation, load characteristics are changed and the relays connected in parallel with the loads or the contacts are also subject to failure.

In some situations, monitor differential relays have been used to sense voltage or current changes when relay contacts undergoing test fail to operate in their normal manner. Here again, load characteristics may be altered if the monitor differential test relay is not used properly. Also, in the latter situation, calibration is necessary since loads are changed or the characteristics of the monitoring differential relay changes with age. In addition, such differential relay test system is quite cumbersome and expensive.

There are systems wherein monitoring relays are pulsed to sample the load current or load voltage. Such systems are disadvantageous in that they are quite large and a great multiplicity of monitoring relays are simultaneously operated each time a relay under test is operated.

A very commonly used system is one wherein recording devices are utilized, such devices employing driven charts and recording pens or styli of some type to record test relay operations. Such recording devices are expensive, cumbersome and subject to failure in recording, and the reading of the test records is quite time consuming.

Accordingly, it is an important object of this invention to provide a test system for relays and relay contacts which is compact and economical to build and operate, wherein the maintaining and servicing thereof is inexpensive and wherein substantially no adjusting is necessary, the maintenance thereof being substantially limited to those periodic checks which are normally necessary in any type of electrical or electronic equipment.

It is another object of the invention to provide a system in accordance with the preceding object which is versatile with no time consuming adjustments required to enable such versatility, i.e., such test system may be utilized in conjunction with A.C. or D.C. loads and with a wide range of voltage and current.

It is a further object to provide a test system in accordance with the preceding objects which is substantially fail safe under most conditions.

An important feature of the invention is a circuit arrangement which enables the system to monitor for make and break of contacts under most load conditions of current and voltage.

Another important feature of the invention is a circuit arrangement which insures that the load characteristics are unchanged and enables the system to be utilized for mechanical life tests.

A further feature of the invention is its capability of operation with substantially no speed limit, i.e., the system of the invention may be operated as slowly as desired or as rapidly as is practicable for a given load. Normally, such speed is, of course, chosen to be within a safe range for the system.

Generally speaking and in accordance with the invention there is provided a circuit comprising a series arrangement of monitor relay means characterized by an energized and a deenergized state and initially being in one of these states, and relay contact means to be tested. There is also provided a load in series arrangement with the test contact means. There are further provided a potential source and means for applying potential from the source to the circuit and the load, the monitor relay means being changed from the initial state to the other state in response to the improper operation of the contact means concurrent with the application of the potential. Indicating means are provided which are operatively associated with the monitor relay means and actuated in response to the changing to the other state.

The novel features of this invention, are set forth with particularity in the appended claims. The invention itself, however, may best be understood by reference to the following description when taken in conjunction with the accompanying drawings which show embodiments of relay test systems according to the invention.

In the drawings, FIG. 1 is schematic depiction of a system for testing a plurality of relay contacts for proper "make" and "break" operation;

FIG. 6 is a three dimensional view of a pulse generator utilized in conjunction with the system of FIG. 1;

Figure 1:
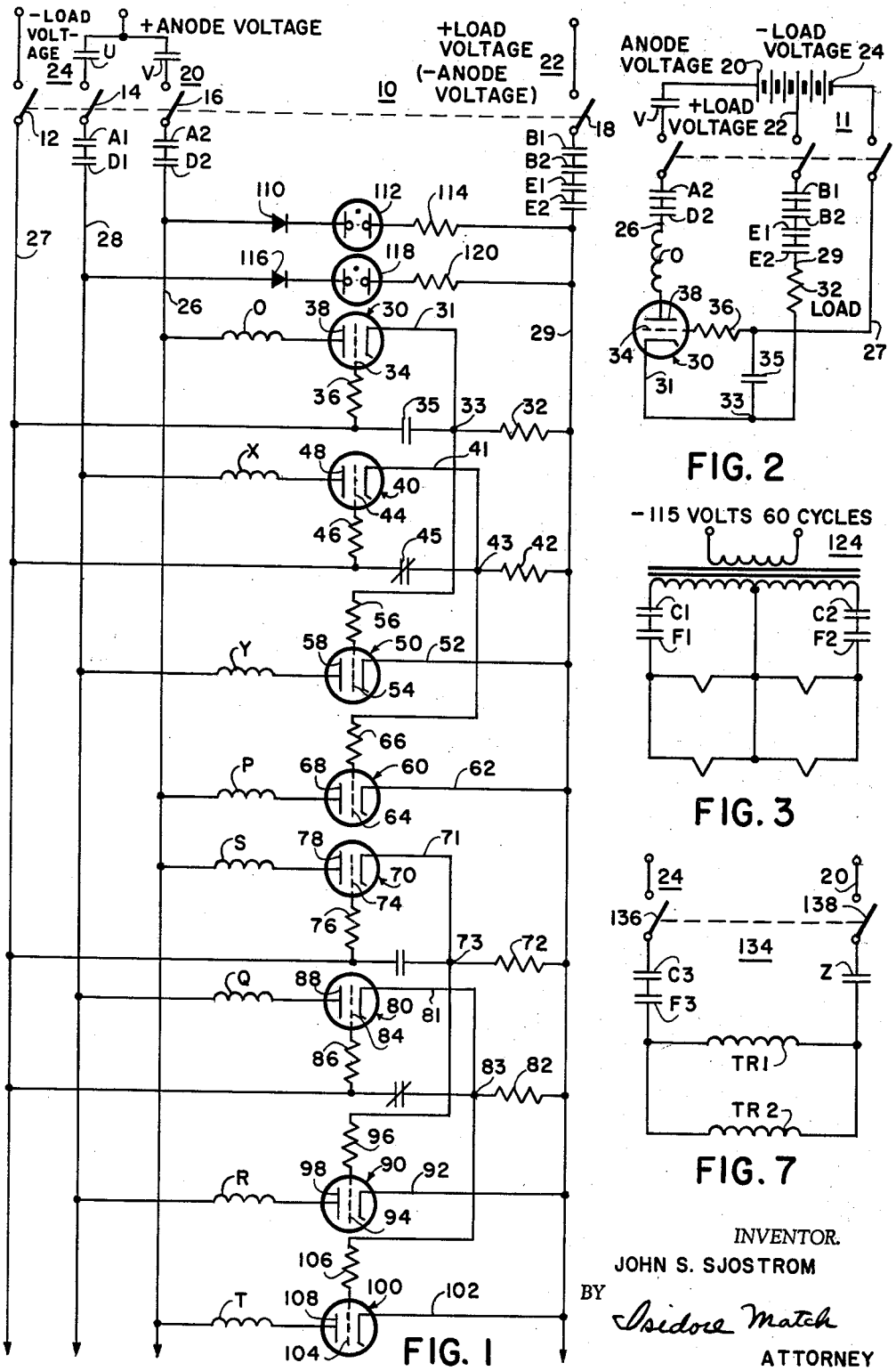
Figure 7:
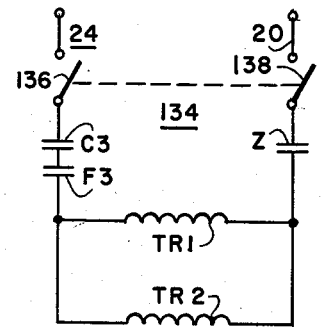
Figure 9:
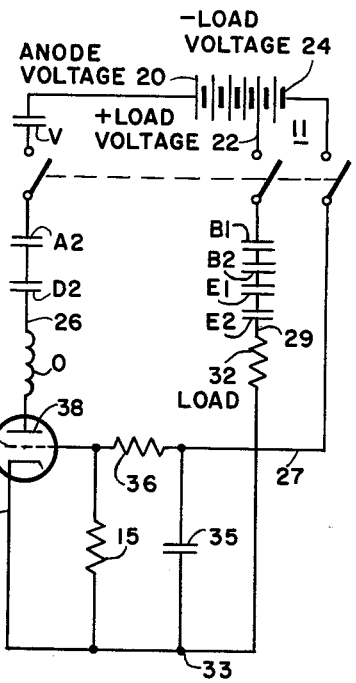
Figure 10:
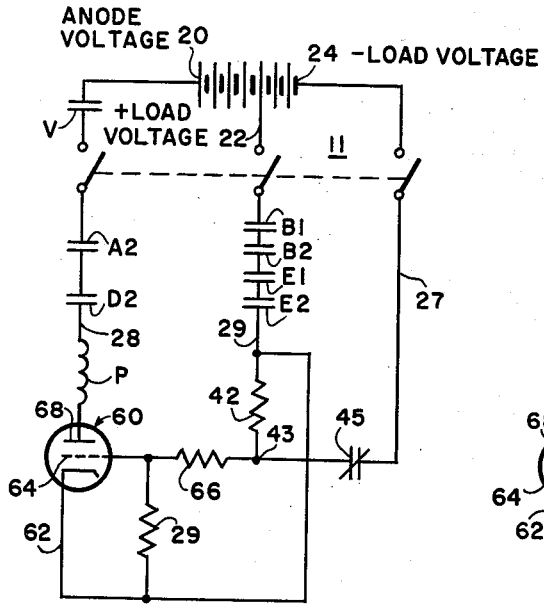

FIGS. 6A, 6B, and 6C comprise a timing diagram of the waveforms provided from the outputs of the pulse generator of FIG. 6;

FIG. 7 is a schematic diagram of a circuit for periodically energizing a test relay to operate test contacts associated therewith;

FIG. 8 is a schematic diagram of monitor relay contacts utilized in the pulse generator of FIG. 6;

FIG. 9 is a diagram of a circuit which is a modification of the basic circuit unit of the system of FIG. 1 for enabling operation of the system with greater load voltages when testing for proper "break" operation;

FIG. 10 is a circuit similar to that of FIG. 9 for testing for proper "make" operation.

Figure 12:
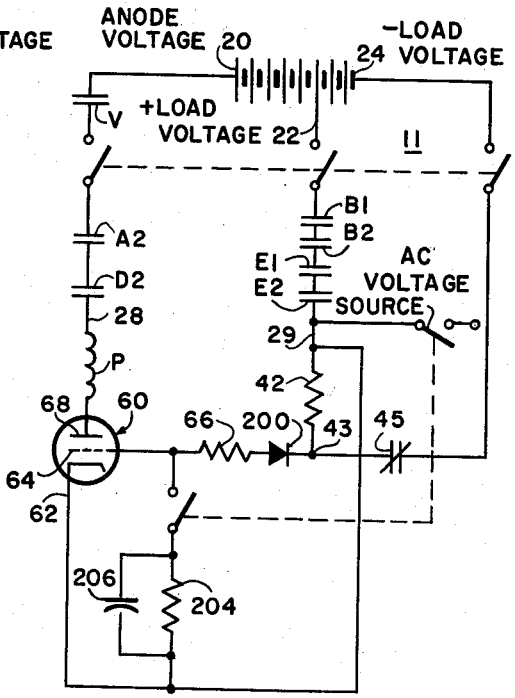
Figure 11:
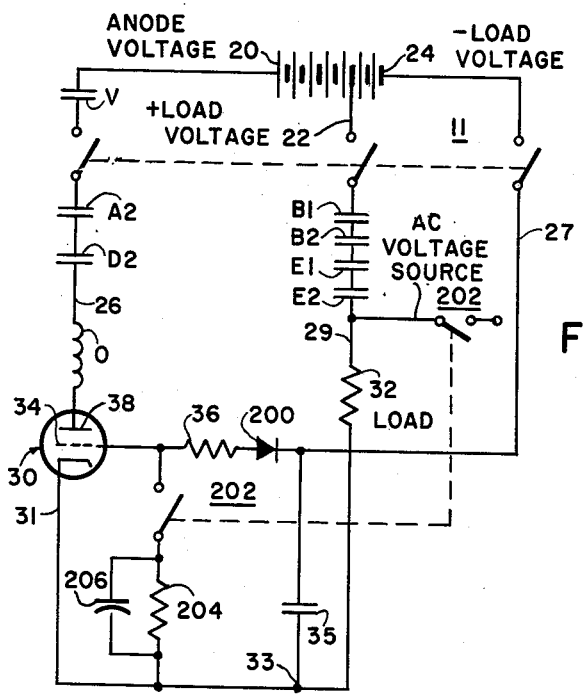

FIG. 11 is a schematic diagram of a circuit which shows a modification of a unit of the system of FIG. 1 for enabling the system to monitor an A.C. load voltage when testing for proper "break" operation; and FIG. 12 is a schematic diagram of a circuit similar to that of FIG. 11 for testing for proper "make" operation.

Referring now to FIG. 1, when normally open switch 10 comprising ganged rotors 12, 14, 16 and 18 is placed in the closed position and provided that the system power relays A, B, D, and E (shown in the indicator arrangement in FIG. 5) are in the energized state whereby normally open contacts A1 and A2, B1 and B2, D1 and D2, and E1 and E2, assume the closed position, and provided that either monitoring contact U or monitoring contact V of the pulse generator shown in FIG. 6 is closed, voltage is provided from a source of positive potential 20 to the anodes of either tubes 30, 60, 70 and 100 or tubes 40, 50, 80 and 90 depending upon which contacts U or V are in the closed position. Source 20 may suitably have a value such as about 240 volts D.C.

Simultaneously, with the closing of switch 10, the plus load voltage (which may also be the minus anode voltage) from a source 22 is applied to the upper terminal of the loads 32, 42, 72 and 82 in circuit with tubes 30, 40, 70, and 80 and directly to the cathodes 52, 62, 92, and 102 of tubes 50, 60, 90 and 100 respectively. Also simultaneously with the closing of switch 10, the minus load voltage which may suitably be ground potential is applied from source 24 to the control grids 34, 44, 74, and 84 of tubes 30, 40, 70 and 80 through resistors 36, 46, 76 and 86 respectively. Monitor relays O, P, S, T, are connected between the anodes 38, 68, 78 and 108 of tubes 30, 60, 70, 100 and the conductor 26 in circuit with positive potential source 20 and contacts V, A2 and D2.

Monitor relays X, Y, Q, and R are connected between the anodes 48, 58, 88 and 98 of tubes 40, 50, 80 and 90 and the conductor 28 in circuit with source 20 and contacts U, A1, and D1. The loads 32, 42, 72 and 82 schematically depicted as resistors in FIG. 1, are provided between the conductor 29 in circuit with plus load voltage source 22 and contacts B1, B2, E1 and E2, and the cathodes 31, 41, 71 and 81 of tubes 30, 40, 70 and 80. The grid electrode 54 of tube 50 is connected to the junction 33 of the cathode 31 of tube 30 and load 32 through a resistor 56, and the grid electrode 64 of tube 60 is connected to the junction 43 of cathode 41 of tube 40 and load 42 through a resistor 66. The grid electrode 94 of tube 90 is connected to the junction 73 of load 72 and cathode 71 of tube 70 through a resistor 96 and the grid electrode 104 of tube 100 is connected to the junction 83 of cathode 81 of tube 80 and load 82. Grid electrodes 34, 44, 74 and 84 of tubes 30, 40, 70 and 80 are connected to conductor 27 in circuit with source 24 through resistors 36, 46, 76 and 86 respectively as has been stated hereinabove.

The individual circuits of FIG. 1 which respectively include tubes 30, 40, 70 and 80 are for testing for the failure of contacts under test to open when operation thereof normally should effect such opening. Accordingly, monitor relays O, X, S and Q may be conveniently designated as "fail to break" relays.

The individual circuits of FIG. 1 which include tubes 50, 60, 90 and 100 are for testing for the failure of contacts under test to close when operation thereof normally should effect such closing. Accordingly, relays Y, P, R and T may be conveniently designated as "fail to make" relays.

In the system of FIG. 1, conductor 26 is connected to conductor 29 through the series arrangement of a forward biased diode 110, an indicating lamp 112 which may suitably be a neon tube and a resistor 114 of a relatively high value and conductor 28 is connected to conductor 29 through the series arrangement of a forward biased diode 116, an indicating lamp 118 and a relatively high value resistor 120, resistors 114 and 120 suitably having the same value. Indicating lamps 112 and 118 are utilized to monitor whether voltages from sources 20, 22 and 24 are actually being applied.

In the system of FIG. 1, the load voltage range is suitably about 6 volts to 100 volts D.C. The lower limit is determined by a required amount of volts for grid bias and the upper limit by a safe grid to cathode potential for a tube. The output of the pulse generator of FIG. 6, i.e., the voltage through the periodically closed contacts U or V may suitably be at a frequency of about ten c.p.s. although it is not intended in the system of this invention to be limited to such frequency of operation since the range may extend from a very low frequency to one much higher than the aforesaid ten c.p.s.

Figure 2:
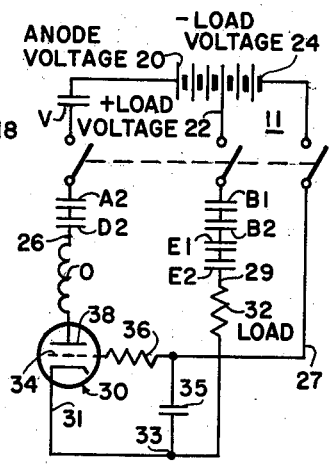
FIG. 2 is a schematic diagram conveniently utilized for explaining the operation of the system of FIG. 1.

Prior to describing the operation of the system of FIG. 1, reference is made to FIG. 2 wherein there is shown the typical component circuit of the system of FIG. 1 for testing for failure to break of normally open relay test contacts which during the period that the test is performed should be in the open position. In this circuit, there are shown the components of the individual circuit of FIG. 1 which contains tube 30, "fail to break" monitor relay O, normally open contacts 35 which are under test, and load 32. In this circuit there are also shown pulse generator contacts V and normally open relay contacts A2 and D2, B1 and B2, and E1 and E2. The most positive end of unidirectional potential source 11 provides the anode voltage source 20, an intermediate point on source 11 provides the plus load voltage source 22 (minus anode voltage) and the most negative point on source 11 (which may be ground potential) provides the minus load voltage source 24.

Referring back to FIG. 1, specifically in connection with the individual circuit containing tube 30 and its associated components, it is seen that grid 34 is located at the negative side of test contacts 35 and cathode 31 is located on the positive side of these contacts. Consequently, when test contacts 35 are open, the voltage at cathode 31 is substantially the plus load voltage, i.e., the voltage of source 22. Grid 34 is substantially at the minus load voltage, i.e., the voltage at conductor 27.

Figure 4:
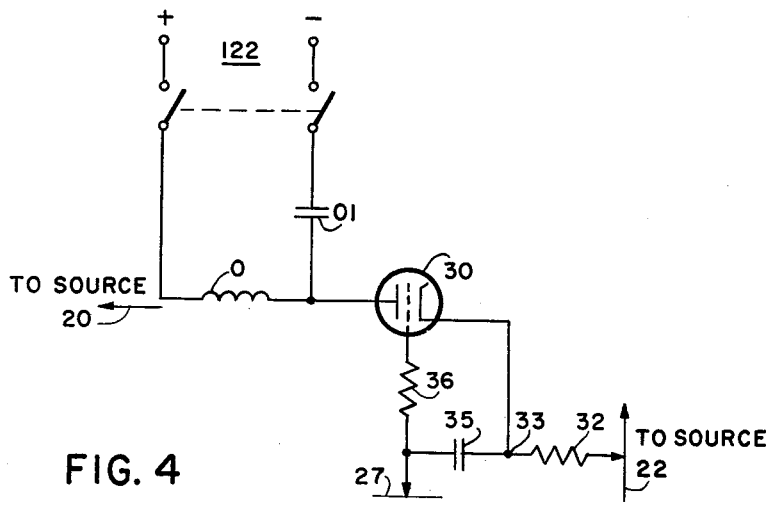
FIG. 4 is a schematic depiction of an arrangement for applying holding voltages to monitor relays utilized in the system of FIG. 1.

When a pulse of voltage is applied from source 20 at the time that contacts V are closed to the anode 38 of tube 30 through closed contacts A2 and D2 and fail to break monitor relay O, tube 30 is not rendered conductive if test contacts 35 are open at this time. However, if the situation is assumed wherein test contacts 35 weld, cathode 31 and the grid 34 of tube 30 both assume substantially the same potential whereby zero bias results and thus when the positive voltage from source 20 is applied to anode 38, tube 30 is rendered conductive, such conductivity effecting the energization of relay O. When relay O is energized, it is sealed in by normally open contact associated therewith. The latter is illustrated in FIG. 4 wherein there is shown a unidirectional potential source 122 and normally open contacts O1 associated with fail to break relay O.

Figure 5:
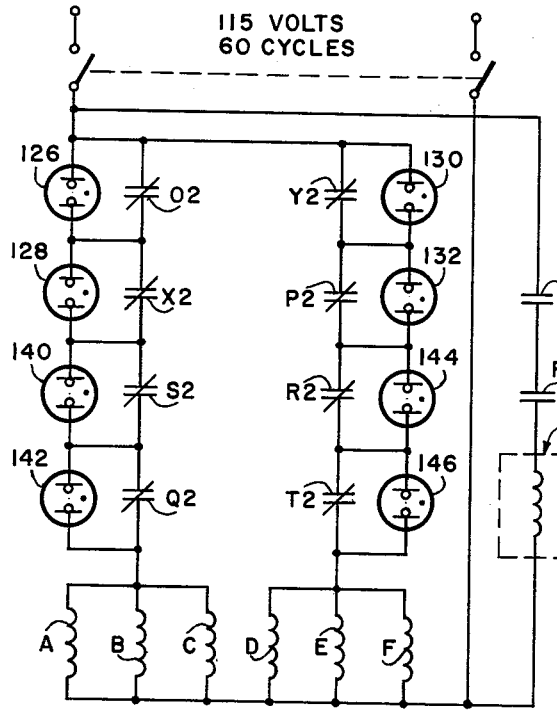
FIG. 5 is a schematic diagram of an indicator arrangement utilized in conjunction with the system of FIG. 1.

At about the same time, normally closed contacts O2 associated with fail to break relay O assume the open position whereupon the indicator lamp 126 in the indicator panel shown in FIG. 5 lights up and relays A, B, and C are deenergized. In this latter connection, the characteristics of the operating coils of relays A, B, C, D, E and F are chosen such that the lighting of an indicator lamp such as lamp 126 results in insufficient current for these coils whereby there is effected their deenergization.

With this arrangement, therefore, the operation of the individual circuit which includes tube 30 and its associated components enables the detection of a weld in test contacts at a time when such contacts should assume the open position. The energization of monitor relay O effects the lighting of an indicator light on the indicator panel and the opening of contacts A1 and A2, D1 and D2, B1 and B2, and E1 and E2 whereby no potentials from sources 20 and 22 can be applied to the system of FIG. 1.

Figure 3:
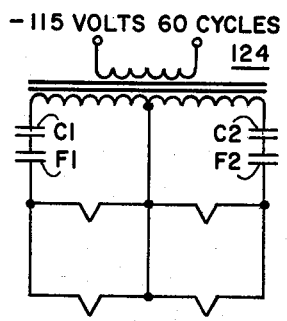
FIG. 3 is a schematic diagram of an arrangement for providing heater voltages to electron discharge devices utilized in the system of FIG. 1.

Also, with the deenergization of relay C, heater voltages can no longer be supplied to the tubes of the system of FIG. 1. This can be understood by referring to FIG. 3 wherein it is seen that the portion of the line voltage appearing in the secondary winding of a transformer 124 is applied to the filaments of the tubes in the system of FIG. 1 through normally open contacts C1 and C2 associated with relay C and contacts F1 and F2 associated with relay F, both of such relays having to be in the energized state for the tube filaments to be heated.

In the operation of a circuit such as that containing tube 40 and its associated components wherein test contacts 45 are normally in the closed position, the same principles of operation apply as those in connection with the operation of the circuit containing tube 30.

Thus, when a pulse of voltage is applied from source 20 through closed contacts U and closed contacts A1 and D1, and the "fail to break" monitor relay X to the anode 48 of tube 40, if there is a weld in normally closed test contacts 45, tube 40 is rendered conductive and monitor relay X is consequently energized. With the energization of relay X, normally open contacts associated therewith (not shown) similar to contacts O1 associated with monitor relay O close to lock in monitor relay X.

At the same time normally closed contacts X2 associated with relay X assume the open position whereby indicator lamp 128 is illuminated and whereby relays A, B, and C are deenergized to remove the potential supply from sources 20 and 22 from the system of FIG. 1 and to remove the heater voltage from the tube filaments.

With regard to the operation of the circuits containing tubes 50 and 60 respectively for testing normally open test contacts 35 and normally closed contacts 45 for "failure to make" it is seen that in tubes 50 and 60, the cathodes 52 and 62 thereof are respectively directly connected to conductor 29 and their grid electrodes 54 and 64 are respectively connected through resistors 56 and 66 to junctions 33 and 43 respectively.

Accordingly, when a pulse of voltage from source 20 is applied to anode 48 through closed contacts U, closed contacts A1 and D1 and "fail to make" monitor relay Y, if normally open contacts 35 are closed at this time as they should be, then cathode 52 of tube 50 is at the plus load voltage and grid 54 of tube 50 is at the minus load voltage whereby tube 50 does not conduct. However, in the event that test contact 35 fails to make, the cathode 52 and grid 54 of tube 50 are both at the plus load voltage and no bias is provided whereby tube 50 is rendered conductive. Here again, when tube 50 conducts, fail to make monitor relay Y is energized, relay Y sealing itself in with normally open contacts associated therewith similar to contacts O1 associated with monitor relay O. Also, normally closed contacts Y2 associated with relay Y and located on the indicator panel open to effect the lighting of indicator neon light 130 and the deenergization of relays D, E, and F to disable the system.

Similarly, with regard to normally closed test contacts 45, when a pulse of voltage is applied through closed contacts V, closed contacts A2 and D2, and fail to make monitor relay P to the anode 68 of tube 60, in the event that test contacts 45 are not closed at this time, tube 60 is rendered conductive and the same events ensue as in the other situations explained hereinabove, contacts P2 opening to effect the illuminating of indicator lamp 132 and also thereby effecting the deenergization of relays D, E and F.

It is thus appreciated that tubes 30, 40, 50 and 60 provide a system for monitoring normally open contacts and normally closed contacts for failure to make and failure to break. The arrangement comprising tubes 70, 80, 90 and 100 is a duplication of the arrangement comprising tubes 30, 40, 50 and 60. Accordingly, an arrangement such as that comprising tubes 30, 40, 50 and 60 may be considered as one unit. The system of FIG. 1 may include any number of such units such as about ten or the like.

In FIG. 7 there is shown an arrangement for periodically energizing relay coils in the system to operate the contacts to be tested. In this arrangement, when switch 134 comprising ganged rotors 136 and 138 is placed in the closed position and provided that relays C and F are energized whereby normally open contacts C3 and F3 respectively associated therewith are in the closed position and provided that contacts Z are closed to permit the application of the voltages from sources 20 and 24, test relays such as TR1 and TR2, etc., are energized. In this connection, contacts Z are desirably closed and opened for substantially equal periods whereby the waveform of the voltage through contact Z is substantially a square wave with about a fifty percent duty cycle. The timing of the closing of contacts U and V is preferably chosen whereby through these contacts when closed, there respectively appear square wave voltages having a relatively low percentage duty cycle, the pulses of the latter waves occurring well within the envelope of the corresponding half cycles of the voltage wave through contacts Z. Actually, the waveforms of the voltage through contacts U and V are preferably substantially 180° displaced in phase with respect to each other. The frequency of the voltage wave through contact Z may be well in excess of ten cycles per second, the pulse trains provided through contacts U and V having the same repetition frequency. The actual duration of the pulses in the waves through contacts U and V may be quite short, a period of about three milliseconds being a suitable time.

With such timing arrangement of the voltages through contacts Z, U and V, the anodes of the tubes in the circuit of FIG. 1 are pulsed at a time when a contact should be open or closed depending upon whether there is a test for failure to make or failure to break. Also, such pulsing occurs at a time when a test contact should be in a stable state, i.e., well after a contact should have opened when a failure to break test is made and well before a contact should be open, when a failure to make test is made.

With regard to FIG. 5, there has been explained hereinabove how the indicator neon lights are caused to be illuminated when a failure test is positive and how the consequent deenergization of any of the relays A, B, and C, and D, E, and F is effected. Obviously, the same operation obtains in the event that monitor relays S, Q, R and T are energized in which situation one of indicating neon lights 140, 142, 144 or 146 is illuminated.

In FIG. 5, there is also shown a relay operated timer 150 in series arrangement with the line voltage source which may suitably be 115 volts, 60 cycles, and normally open contacts C4 and F4 associated with relays C and F respectively. It is seen that the deenergization of relay C or F causes a halting of operation of the timer. Such deenergization, of course, occurs when a failure test is positive and timer 150 accordingly, serves to indicate at what point in the life of the particular relay contacts under test, such failure occurs. Timer 150 may be any suitable timing device which is well known in the art.

In FIG. 6 wherein the square wave pulse generator is depicted, a fixed speed motor such as an A.C. induction motor includes a shaft 162, shaft 162 being coupled to a gear box 164. Shaft 162 drives gear box 164 which has three output shafts 166, 168 and 170 which may be adapted to rotate at the same speed. Affixed to each output shaft 166, 168 and 170 respectively are round horseshoe magnets 172, 174 and 176. Associated with magnets 172, 174 and 176 are single pole, double throw relay contacts U, V and Z respectively which may suitably be of the mercury wetted type enclosed in a glass capsule. The capsules are suitably positioned on adjustable mounting means (not shown) whereby the respective vertical positions and horizontal positions thereof are adjustable. A vertical adjustment permits the most sensitive position of magnetic energization to be located and a horizontal adjustment permits the air gap between a magnet and its associated capsule to be adjusted so that pulses of varying durations may be obtained.

The initial rotational relationship of the three permanent magnets 172, 174 and 176 with respect to the poles thereof is adjusted to that the proper timing of pulses is obtained to monitor the test contacts when they are either opened or closed as previously explained hereinabove. After such initial rotational adjustment of magnets 172, 174 and 176 is decided upon, the gear train arrangement contained in gear box 164 insures the proper pulse output sequence.

Connected to the common pole of contacts U and V is the anode voltage source 20, the output being obtained from these contacts respectively when the normally open contacts thereof make contact with the associated armature. Depending upon the position of an associated permanent magnet, the pulse outputs from contacts U and V, i.e., pulses of potential from source 20 of a given duration are provided for the anodes of the tubes in the system of FIG. 1.

The common pole of contacts Z is also connected to source 20 and its relationship with its associated permanent magnet as shown in FIG. 6 is such whereby the air gap therebetween provides a substantially 50 percent duty cycle square wave voltage output therefrom. The output of contact Z is the voltage for energizing the relay coils by which the contacts under test are operated.

FIGS. 6A, 6B and 6C comprise a timing diagram of the waveforms of the outputs of contacts U, V and Z. It is seen that the waveform in FIG. 6A is the output from contacts Z, the waveform of FIG. 6B is the output from contacts V and the waveform of FIG. 6C is the output from contacts U. The outputs from contacts U and V are respectively about 180° out of phase with respect to each other, the pulses of these waveforms respectively occurring within the envelopes of respective opposite corresponding half cycles of the wave from the output of contacts Z.

In the pulse generator of FIG. 6, as has been shown, the widths of the output pulses therefrom are determined respectively by the air gaps between the magnets and their associated capsules. The frequencies of the output pulses are determined by the rotational speeds of the magnets. Since these horseshoe magnets are gear driven, they all may be caused to revolve at the same frequency or at different respective frequencies. The pulse output produced by each capsule has a definite time relationship with the outputs from the other capsules which is fixed by the relative angular adjustment of the magnets and the air gap spacing. It is to be noted that the normally open contacts of a capsule are caused to close twice during a revolution of a horseshoe magnet.

The pulse generator of FIG. 6 need not be limited to three outputs as shown but may have any number of geared outputs as may be required for different type situations. Also, depending on the desired use therefor, the geared outputs can be adapted to operate at any combination of different respective frequencies and different pulse widths, such frequencies and pulse widths being arranged to have a definite time relationship therebetween.

In FIG. 8 wherein there is shown a diagram of mercury wetted contacts 180, a common pole 182 has attached thereto an armature 184 which is normally in contact with poles 186. Also, included are poles 188. The arrangement is enclosed in a hermetically sealed glass capsule 190 which contains a pool of mercury 192 at the bottom thereof. Source 20 is connected to common pole 182.

It has been found that such contacts have a very long life and are capable of performing billions of operations with low breakdown and have low and consistent contact resistance. Also, such contacts have substantially no bounce. It is quite important to have this type reliable contacts since it is an important factor in the reliability of the system.

In situations where the amount of life test work is relatively limited, it may be desired to also utilize a variable speed drive motor to permit the permanent magnet drive to meet various cyclic test requirements. Alternatively, where much life test work is the normal practice, there may be utilized a number of fixed speed drives of various frequencies.

With the system of this invention, the range of cycling speeds is quite wide. There is no limit to the lower speed of this range and the upper range is governed by the operate time of the relay being tested, the operate time of the system, and a safe speed for the contact loads.

It has been stated above that in the circuit of FIG. 1, the load voltage may have a limited range, the lower limit of such range being the bias voltage required for a tube and the upper limit being a given figure such as about 100 volts D.C., i.e., a safe grid to cathode potential. Obviously, the lower limit cannot be reduced but the upper limit of the range may be extended by the use of a circuit such as shown in FIG. 9.

In the circuit of FIG. 9 which is similar to a component circuit such as that containing tube 30 in FIG. 1 and accordingly the same designating numerals have been utilized for indicating corresponding elements, a second resistor 15 is included between the grid 34 of tube 30 and junction 33. With this arrangement, resistors 36 and 15 comprise a voltage divider. The values of resistors 36 and 15 are determined by the following considerations:

(1) The total resistance is preferably a high value (such as about 5 or 6 megohms) to prevent any possible arc suppression.

(2) The values chosen for the resistors affect not only the upper load voltage which may be applied but also raises the lower load voltage limit that may be monitored. With the use of these resistors as shown in FIG. 9, the upper limit of the voltage for the load may therefore be substantially extended.

The circuit of FIG. 10 fulfills the same purpose as the circuit of FIG. 9 during a failure to make test such as shown in the component circuit of FIG. 1 which contains tube 60. Accordingly, the same numerals have been utilized for corresponding circuit components. In the circuit of FIG. 10, resistors 66 and 29 provide the voltage divider action for the same purposes as explained hereinabove in connection with the circuit of FIG. 9.

To enable the monitoring of an A.C. load voltage such as in a situation where it is desired to test for failure to break, the circuit of FIG. 11 may be utilized. In this circuit which is substantially similar to the component circuit of the system of FIG. 1 which includes tube 30, grid resistor 36 is connected to conductor 27 through the anode to cathode path of a diode 200. Grid 34 is also connected to junction 33 through a switch 202 and the parallel combination of a resistor 204 and a capacitor 206.

In the operation of the circuit of FIG. 11, switch 202 is left open during the monitoring of D.C. load voltages but is closed when an A.C. load voltage is monitored. In the latter situation, diode 200 performs a rectifying function and resistor 204 and capacitor 206 prevent the grid 34 of tube 30 from following the changing A.C. voltage. In this circuit, resistor 36 preferably is chosen to have a relatively high value and capacitor 206 is chosen to have a relatively low value in order to prevent arc suppression. Without the presence of the capacitor, the resistor, and the diode in the circuit of FIG. 11, tube 30 would alternately be conductive and non-conductive through following the load voltage.

The circuit of FIG. 12 functions in the same manner as the circuit of FIG. 11 where a failure to make test is made. The circuit of FIG. 12 is substantially similar to the component circuit of the system of FIG. 1 which contacts tube 60 and is modified for the monitoring of an A.C. load voltage.

Since the system of this invention utilizes anode pulses having a relatively short period such as about three milliseconds, the failure is consequently indicated in such three milliseconds and thus a welding of contacts or a delayed separation due to the momentary sticking of contacts is detected.

Generally speaking, a failure to break or a failure to make during operation of test contacts causes a particular indicating light to be illuminated. In the situation where single pole double throw contacts are under test, a failure to break on the part of such contacts is indicated by the illumination of both a failure to break light and a failure to make light. This is, of course, due to the fact that the break circuit on the normally closed contacts is pulsed at the same time that the make circuit on the normally open contact is pulsed. Therefore, both circuits are actuated since a welding of contacts in such device prevents the opposite contact from closing.

The system of this invention is substantially completely fail safe. Thus, loss of A.C. power disables the system. Possibly, loss of test relay power may result in certain type failures not being indicated if the power is taken from the load supply voltage. In this connection, a relay sealed in on the voltage supply for the test coil may be utilized. In the event that the voltage supply for test relay coils is maintained separately from the supply voltage, here again a relay sealed in on the voltage supply may be utilized.

From the foregoing, it is seen that the system of this invention may be utilized for A.C. or D.C. loads and with a wide range of voltages and a wide range of currents; that it is substantially completely fail safe; and that it is simple whereby upkeep and servicing thereof is inexpensive. Also, it is seen that the monitoring for make and break of contacts is accomplished under substantially all load conditions of current and voltage with load characteristics remaining unchanged. It is also to be noted that the system may be used for mechanical life tests and that the speed of operation thereof is substantially unlimited.

While there have been shown particular embodiments of this invention, it will, of course, be understood that it is not wished to be limited thereto since modifications may be made both in circuit arrangements and in the instrumentalities employed, and it is contemplated in the appended claims to cover any such modifications as fall within the true spirit and scope of the invention.

What is claimed as new and desired to be secured by Letters Patent of the United States is:

1. In combination, an arrangement comprising a plurality of groups of circuits, a first source of unidirectional potential, a second source of unidirectional potential, a reference potential, a first of said circuits comprising an electron discharge device comprising a first anode, a first control grid and a first cathode, a first monitor relay connected between said first source and said first anode, said first grid being coupled to said reference potential, first relay contact means to be tested which are operated to be in the open state during first chosen times and the closed state during second chosen times, said first cathode being coupled to said reference potential through said first contact means, a first load connected between said second potential source and said first cathode, a second of said group of circuits comprising a second electron discharge device comprising a second anode, a second control grid, and a second cathode, a second monitor relay connected between said first potential source and said second anode, said second grid being coupled to said reference potential, second relay contact means to be tested which is operated to be in the closed state during said first chosen times and in the open state during said second chosen times, said second cathode being coupled to said reference potential through said second relay contact means, a third circuit of said group comprising a third electron discharge device comprising a third anode, a third control grid and a third cathode, a third monitor relay connected between said first potential source and said third anode, said third grid being connected to said first cathode, said third cathode being connected to said second potential source, a fourth circuit of said group comprising a fourth electron discharge device having a fourth anode, a fourth control grid and a fourth cathode, a fourth monitor relay connected between said first potential source and said fourth anode, said fourth grid being coupled to said second cathode, said fourth cathode being connected to said second potential source, means for applying potential from said second potential source to said first and second loads, means for applying potential from said first potential source to said first and fourth anodes during said first chosen times and for applying the potential from said first potential source to said second and third anodes during said second chosen times, a closed state of said first contact means and an open state of said second contact means during said first times causing said first and fourth electron discharge device to be rendered conductive whereby said first and fourth monitor relays are energized respectively, and means for applying potential from said first source to said second and third anodes during said second chosen times, a closed state of said second contact means and an open state of said first contact means during said second times causing said second and third electron discharge devices to be rendered conductive to energize said second and third monitor relays respectively.

2. In the combination defined in claim 1 wherein said first and second contact means are operatively associated with a test relay, there being further provided therein means for periodically energizing said test relay for durations of a chosen period, said first times occurring in the periods of said durations, said second times occurring within the intervals between said durations.

3. In the combination defined in claim 1 wherein said means for applying said first potential at said first and second times respectively and for energizing said test relay comprises first, second, and third monitoring contact means, first, second, and third permanent magnets adapted to be rotated at a chosen speed, said first monitoring contact being positioned adjacent said first magnet to define a first given air gap therebetween, said second monitoring contact being positioned adjacent said second permanent magnet to define a second given air gap therebetween and said third monitoring contact being positioned adjacent said third permanent magnet to define a third given air gap therebetween whereby when potential from said first source is applied to said monitoring contacts and said permanent magnets are rotated, there is produced from said first contact a pulse train having pulses occurring at said first given times, there is produced from said second monitoring contact a pulse train having pulses occurring at said second times and there is produced from said third monitoring contact a pulse train for periodically energizing said test relay.

4. In the combination defined in claim 1 wherein each of said monitor relays has associated therewith indicating means which is actuated in response to energization of a corresponding monitor relay.

5. In the combination defined in claim 1 wherein there is further included a third potential source and respective means responsive to the energization of each of said monitor relays for locking said monitor relays into circuit with said third source.

6. In the combination defined in claim 1 wherein there is further included normally energized relay system conditioning means for enabling the means for applying said potential from said first and second sources and for energizing said relays associated with said test contacts, said relay system conditioning means being deenergized in response to the actuation of an indicating means.

7. In the combination defined in claim 6 and further including timing means which is actuated in response to the energization of said relay system conditioning means and is deactuated in response to the deenergization of said relay system conditioning means.

8. In the combination defined in claim 1 wherein said first and second grids respectively are coupled to said reference potential through first resistances and said first and second grids are coupled to said first and second cathodes through second resistances respectively, wherein said third and fourth grids are coupled to said first and second cathodes through third resistances respectively and wherein said third and fourth grids are coupled to said third and fourth cathodes respectively through fourth resistances, the values of said resistances being so chosen whereby the grid to cathode potential of each of said electron discharge devices is maintained below a prescribed value.

9. In the combination defined in claim 1 wherein said first and second grids are coupled to said reference potential through respective series arrangements, each of said series arrangement comprising a first resistance and the anode to cathode path of a first diode, a pair of first parallel arrangements, each comprising a second resistance and a capacitance and means for selectively placing one of said parallel arrangements in circuit between said first grid and said first cathode and for selectively placing in circuit said second parallel arrangement with said second grid and said second cathode, wherein said third and fourth grids are coupled to said first and second cathodes through a pair of series arrangements respectively, each of said series arrangements comprising a third resistance and the anode to cathode path of a second diode, a pair of second parallel arrangements, each of said second parallel arrangements comprising a fourth resistance and a second capacitance, and means for selectively inserting one of said second parallel arrangements in circuit between said third grid and said third cathode and for selectively inserting the other of said parallel arrangements in circuit with said fourth grid and said fourth cathode.

References Cited in the file of this patent
UNITED STATES PATENTS
2,833,983    Shaw  ------------------ May 6, 1958